United States Patent
Bohizic et al.

(10) Patent No.: US 8,875,114 B2
(45) Date of Patent: Oct. 28, 2014

(54) EMPLOYING IDENTIFIERS PROVIDED BY AN OPERATING SYSTEM OF A PROCESSING ENVIRONMENT TO OPTIMIZE THE PROCESSING ENVIRONMENT

(75) Inventors: Theodore J. Bohizic, Hyde Park, NY (US); Rahul Chandrakar, Bangalore (IN); Mark H. Decker, Rhinebeck, NY (US); Viktor S. Gyuris, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1866 days.

(21) Appl. No.: 11/859,186

(22) Filed: Sep. 21, 2007

(65) Prior Publication Data

US 2009/0083720 A1    Mar. 26, 2009

(51) Int. Cl.
G06F 9/45       (2006.01)
G06F 9/455      (2006.01)
G06F 12/08      (2006.01)

(52) U.S. Cl.
CPC ........ *G06F 12/0875* (2013.01); *G06F 9/45504* (2013.01)
USPC ....................................................... 717/151

(58) Field of Classification Search
None
See application file for complete search history.

(56) References Cited

U.S. PATENT DOCUMENTS

| | | | |
|---|---|---|---|
| 5,694,567 A * | 12/1997 | Bourekas et al. .................. | 711/3 |
| 6,223,256 B1 * | 4/2001 | Gaither ........................... | 711/134 |
| 6,578,020 B1 * | 6/2003 | Nguyen .......................... | 706/15 |
| 6,625,809 B1 * | 9/2003 | Duff ............................... | 717/169 |
| 6,708,330 B1 * | 3/2004 | Moberg et al. ................. | 717/158 |
| 6,842,894 B1 * | 1/2005 | Havemose ..................... | 717/148 |
| 6,980,946 B2 * | 12/2005 | Giles et al. ..................... | 703/22 |
| 7,568,189 B2 * | 7/2009 | Suba et al. ..................... | 717/145 |
| 2003/0070161 A1 * | 4/2003 | Wong et al. ................... | 717/148 |
| 2003/0093649 A1 | 5/2003 | Hilton ............................ | 712/41 |
| 2005/0198620 A1 * | 9/2005 | Mathiske et al. ............. | 717/124 |
| 2007/0011666 A1 * | 1/2007 | Tan ................................ | 717/140 |
| 2007/0094648 A1 * | 4/2007 | Post ............................... | 717/140 |
| 2007/0240136 A1 * | 10/2007 | Garyali et al. ................ | 717/140 |
| 2008/0184210 A1 * | 7/2008 | Lee et al. ....................... | 717/136 |

* cited by examiner

*Primary Examiner* — Jue Louie
(74) *Attorney, Agent, or Firm* — Steven Chiu, Esq.; Blanche E. Schiller, Esq.; Heslin Rothenberg Farley & Mesiti P.C.

(57) ABSTRACT

Optimizations are provided for processing environments. Selected memory objects are tagged with unique identifiers by an operating system of the environment, and those identifiers are used to manage processing within the environment. By detecting by a processing platform of the environment that a memory object has been tagged with a unique identifier, certain tasks may be bypassed and/or memory objects may be reused, even if located at a different location.

19 Claims, 7 Drawing Sheets

US 8,875,114 B2

EMPLOYING IDENTIFIERS PROVIDED BY AN OPERATING SYSTEM OF A PROCESSING ENVIRONMENT TO OPTIMIZE THE PROCESSING ENVIRONMENT

TECHNICAL FIELD

This invention relates, in general, to optimizing processing environments, and in particular, to employing identifiers provided by an operating system of a processing environment to optimize that environment.

BACKGROUND OF THE INVENTION

There are different types of processing environments, including emulated and non-emulated environments. In an emulated environment, the processors are designed in one architecture, but emulate a different architecture. As a specific example, processors architected in the PowerPC® architecture, offered by International Business Machines Corporation, emulate the z/Architecture® also offered by International Business Machines Corporation. As a further example, processors having, for instance, an Intel® architecture emulate the z/Architecture® or other architectures offered by International Business Machines Corporation or other companies.

In contrast, in a non-emulated environment, the processors are designed in one architecture and the processing is performed based on that architecture. Emulation is not performed.

Some emulated environments take advantage of Dynamic Binary Translation (DBT) to improve performance. In such an environment, the emulator is coupled to a compiler, such as a Just-In-Time (JIT) compiler used to optimize processing. The JIT compiler compiles selected code segments and places the compiled code segments (a.k.a., traces) in a code cache. The management of such a code cache is difficult, however, because the emulator is unaware of processes mapped to memory regions, and the emulator cannot reuse compiled (a.k.a., translated) binary code across multiple sessions. Thus, a great deal of processing power is wasted in such environments.

SUMMARY OF THE INVENTION

Based on the foregoing, a need exists for a capability that enables reuse of compiled binary code across multiple sessions. A need exists for a capability to provide further optimizations for processing environments, including emulated environments. A further need exists for a capability that enables reuse of memory objects, including compiled code, even if the memory objects are relocated.

The shortcomings of the prior art are overcome and additional advantages are provided through the provision of an article of manufacture that includes at least one computer usable medium having computer readable program code logic to facilitate optimization of a processing environment. The computer readable program code logic when executing performing, for instance, the following: determining by a processing platform of the processing environment that a static memory object has been marked with an identifier, wherein the static memory object has been marked by an operating system of the processing environment, and wherein the identifier is not tied to a location of the static memory object; and in response to the determining, saving one or more aspects of the internal state of the processing platform and the identifier in a saved area to optimize access of the static memory object.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, optimizations are provided for processing environments. As one example, selected memory objects are tagged with unique identifiers and those identifiers, which are independent of the object's location, are used to manage the flow of processing within a processing environment. For instance, memory objects are tagged by an operating system of the environment, and a processing platform of the environment determines processing flow based on the tagging. As an example, by detecting by the processing platform that a memory object has been tagged with a unique identifier, certain actions may be performed by the processing platform including, but not limited to, saving certain aspects of the internal state of the processing platform, and/or retrieving those saved aspects of the internal state. By saving the internal state, access of the memory object is optimized, by enabling, for instance, faster or easier retrieval of the object, etc.

As one particular example, the optimizations are provided in an emulated environment, and it is a guest operating system of the emulated environment that provides the tags and it is an emulator of the environment that uses the tags. There is cooperation between the guest operating system and the emulator to provide certain optimizations for the emulator. The guest operating system tags selected memory objects, such as code segments, with unique identifiers, and then the emulator detects those segments are tagged and performs processing influenced by the tags. For instance, the emulator saves the code segment and its identifier in a cache for later retrieval. Moreover, by employing the tags, logic used to determine if the code segment is frequently executed is bypassed; the compiled code segment is maintained in a cache of compiled code segments, which is separate from a cache of compiled versions of frequently executed code segments; a look-up is performed in the cache for an identifier of the code segment, wherein in response to a failure of the look-up, the code segment is compiled and the compiled code segment is stored in the cache, and in response to the look-up succeeding, the compile code segment is executed; and/or a code segment invalidation mechanism is bypassed that governs the cache.

Figure 1:
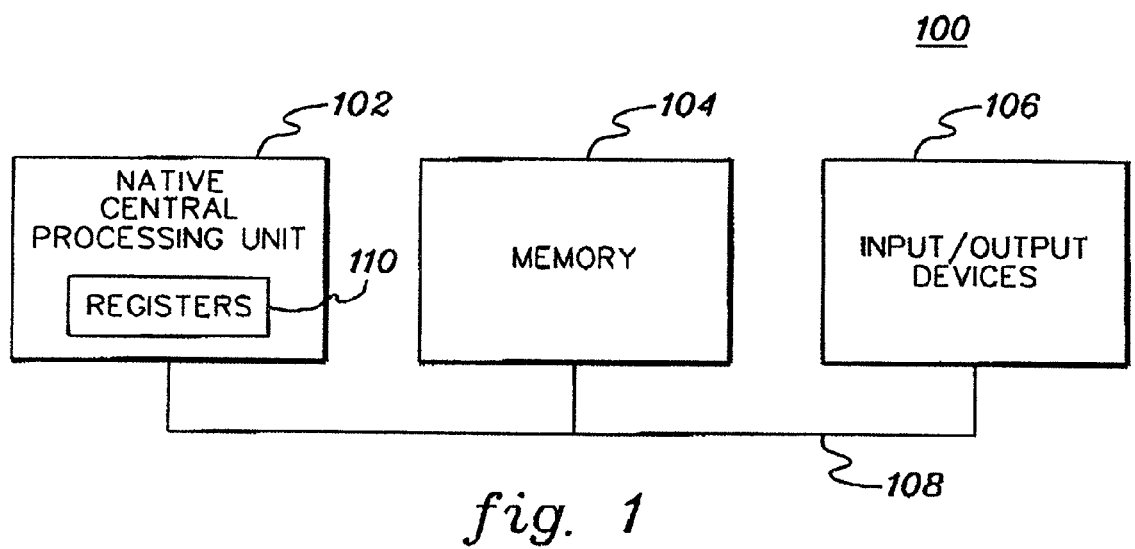
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation. Aspects of the z/Architecture® are described in "z/Architecture Principles of Operation," IBM Publication No. SA22-7832-05, April 2007, which is hereby incorporated herein by reference in its entirety.

Processing environment 100 includes, for instance, a native processor 102 (e.g., central processing unit (CPU)), a memory 104 (e.g., main memory), and one or more input/output (I/O) devices 106 coupled to one another via, for example, one or more buses 108 or other connections. As one example, processor 102 is part of a pSeries® server offered by International Business Machines Corporation (IBM®), Armonk, N.Y. IBM®, pSeries®, PowerPC® and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

To provide emulation, the processing environment is architected to include an emulator, a guest operating system and one or more guest applications. These architected features are further described with reference to FIG. 2.

Figure 2:
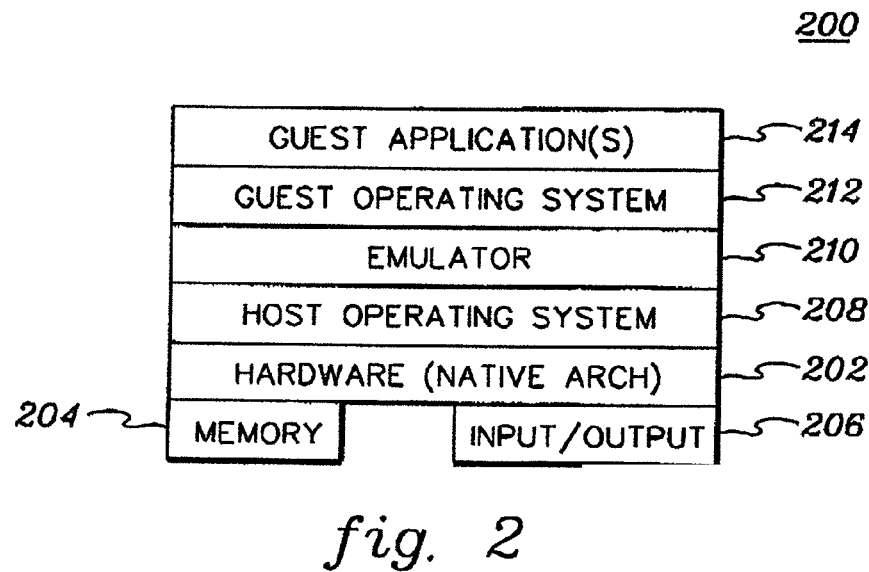
FIG. 2 depicts one embodiment of the architecture of the processing environment of FIG. 1, in accordance with an aspect of the present invention.

Referring to FIG. 2, one embodiment of a system architecture 200 of processing environment 100 is described. System architecture 200 includes, for instance, a plurality of implementation layers, which define the architected aspects of the environment. In this particular example, the layers include hardware 202, which is coupled to memory 204 and input/output devices and/or networks 206 via one or more interfaces and/or controllers; a host operating system 208; an emulator 210; a guest operating system 212; and one or more guest applications 214; as examples. One layer is coupled to at least one other layer via one or more interfaces. For instance, guest applications 214 are coupled to guest operating system 212 via at least one interface. Other interfaces are used to couple the other layers. Moreover, the architecture can also include other layers and/or interfaces. Various of the layers depicted in FIG. 2 are further described below.

Hardware 200 is the native architecture of the processing environment and is based on, for instance, Power 4, PowerPC®, Intel®, or other architectures. Running on the hardware is a host operating system 202, such as AIX® offered by International Business Machines Corporation, or LINUX. AIX® is a registered trademark of International Business Machines Corporation.

Emulator 210 includes a number of components used to emulate an architecture that differs from the native architecture. In this embodiment, the architecture being emulated is the z/Architecture® offered by IBM®, but other architectures may be emulated as well. The emulation enables a guest operating system 212 (e.g, z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
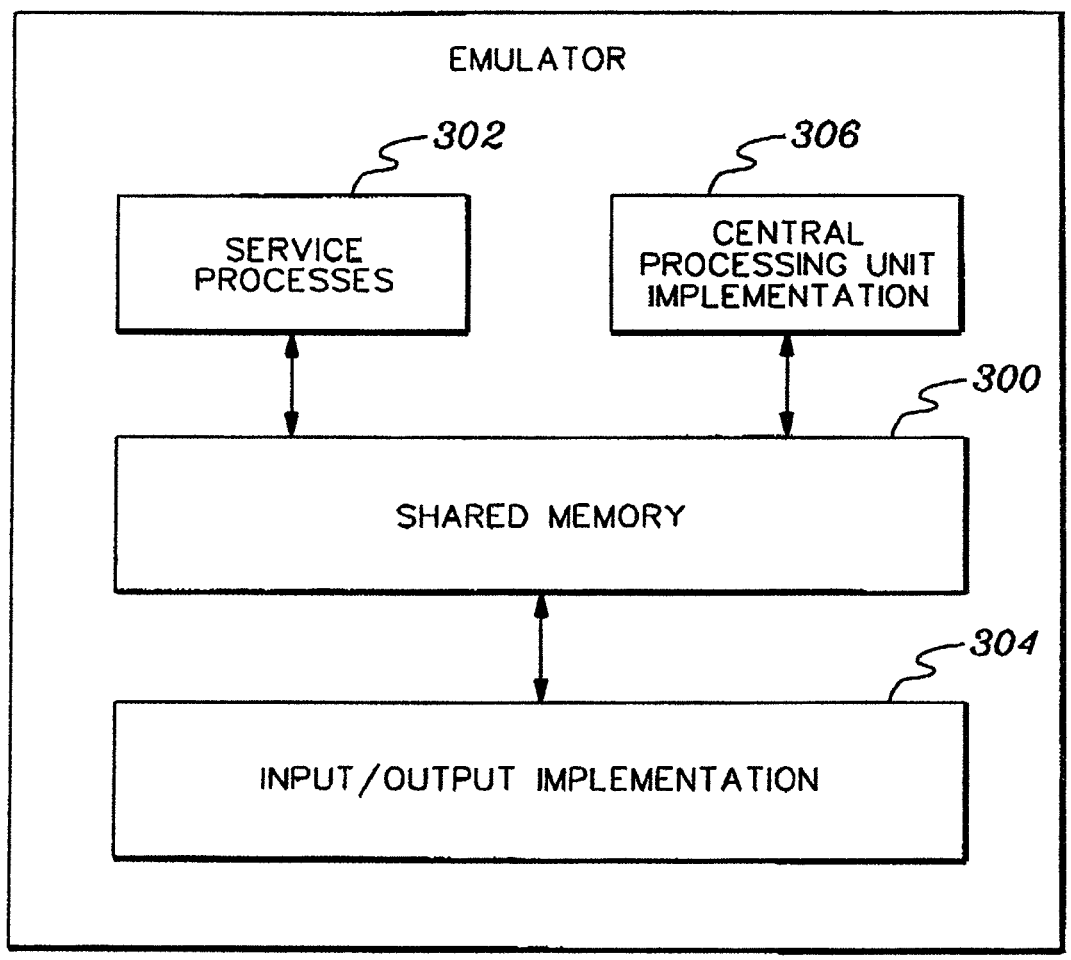
FIG. 3 depicts one embodiment of further details of the emulator of FIG. 2, in accordance with an aspect of the present invention.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery, in one aspect of the present invention.

Central processing unit (CPU) implementation 306 is responsible for executing instructions and managing the processing. It includes a number of components, which are described with reference to FIGS. 4A-4C.

Figure 4A:
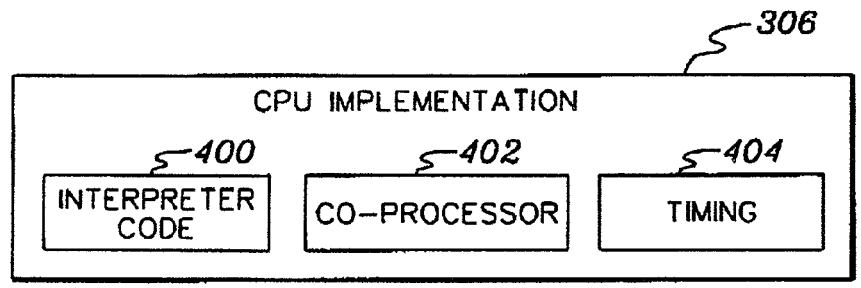
FIG. 4A depicts one embodiment of further details of the central processing unit implementation of the emulator of FIG. 3, in accordance with an aspect of the present invention.
Figure 4B:
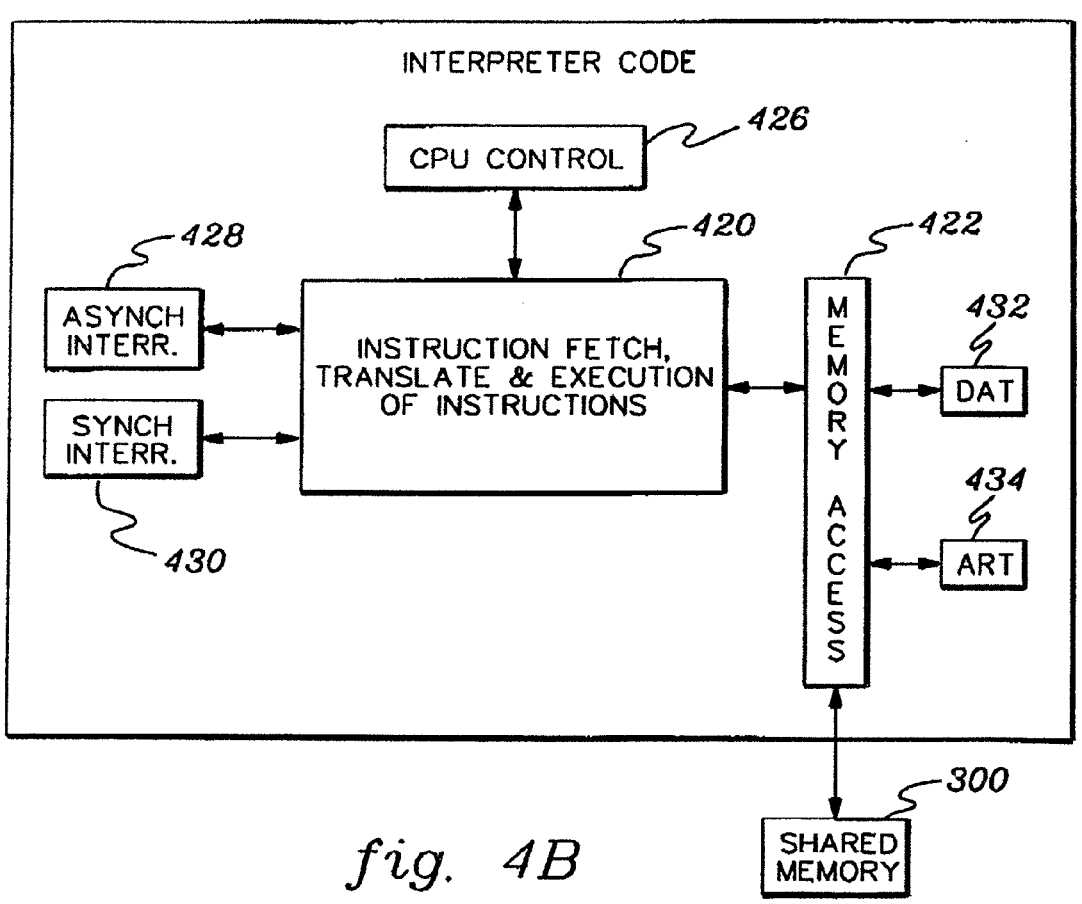
FIG. 4B depicts one embodiment of further details of the interpreter code of the CPU implementation of FIG. 4A, in accordance with an aspect of the present invention.

Referring to FIG. 4A, CPU implementation 306 includes, for instance, interpreter code 400 used to fetch, translate and execute instructions; an architectured co-processor 402 that aids in initial start-up and communication with the chip (e.g., Service Call Logical Processor (SCLP) processes); and timing facilities 404 that are responsible for timing functions of the emulator. Further details regarding interpreter code 400 are described with reference to FIG. 4B.

Interpreter code 400 includes, for instance, an interpretation unit 420 coupled to a memory access unit 422, a CPU control 426, an asynchronous interruption handler 428 and a synchronous interruption handler 430.

Interpretation unit 420 is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

In a further example, the providing includes creating during, for instance, a translation process, a native stream of instructions for a given set of guest instructions. This includes identifying the functions and creating the equivalent native instructions.

If an instruction includes a memory access, then memory access unit 422 is used to access shared memory 300. The memory access unit may use translation mechanisms, such as dynamic address translation (DAT) 432 or access register translation (ART) 434, to translate a logical address to an absolute address, which is then used to access the memory or may be further translated, if needed.

In this embodiment, the processing within interpretation unit 420 is to be streamlined. Thus, if a more complex circumstance arises, such as a wait state or changing from one architecture level to another architecture level (e.g., z/Architecture® to ESA/390, etc.), control is transferred to CPU control 426, which handles the event and then returns control to interpretation unit 420.

Further, if an interrupt occurs, then processing transitions from interpretation unit 420 to either asynchronous interruption handler 428, if it is an asynchronous interruption, or synchronous interruption handler 430, if it is a synchronous interruption. In particular, the interpretation unit monitors certain locations in shared memory and if a location has changed, it signifies an interrupt has been set by the CPU or I/O. Thus, the interpretation unit calls the appropriate interruption handler. After the interrupt is handled, processing returns to interpretation unit 420.

To facilitate processing, interpretation unit 420 performs in two modes of execution, including interpretive mode and compiled mode. In interpretive mode, one guest instruction is executed at a time. In compiled mode, however, a plurality of guest instructions (referred to as a code segment or a trace) are compiled and stored in a cache as a compiled code segment for subsequent retrieval and execution. This is further described with reference to FIG. 4C.

Figure 4C:
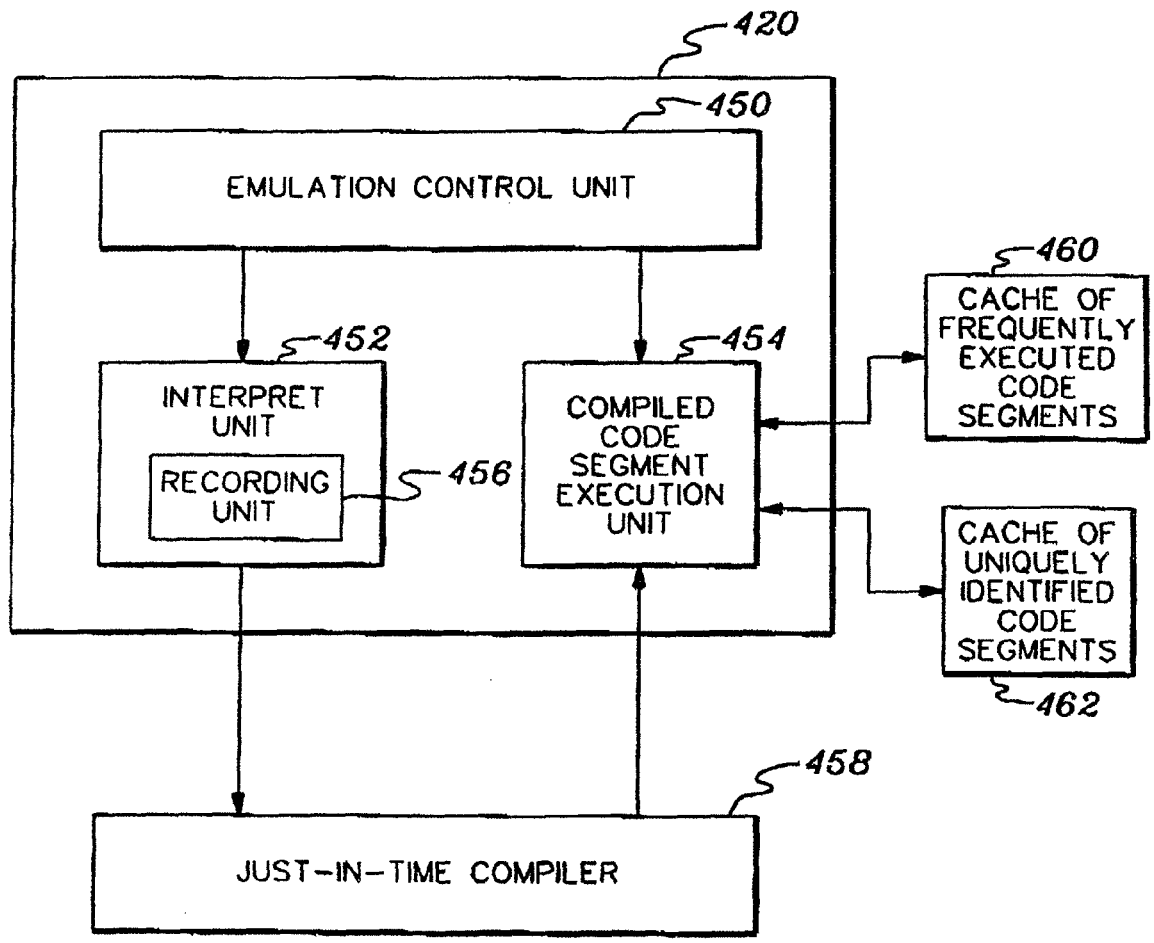
FIG. 4C depicts one embodiment of further details of the interpretation unit of FIG. 4B, in accordance with an aspect of the present invention.

As depicted in FIG. 4C, interpretation unit 420 includes an emulation control unit 450, which decides which execution mode to select. As one example, emulation control unit 450 is coupled to an interpret unit 452 and a compiled code segment execution unit 454. If the emulation control unit, based on logic described below, determines that interpret mode is the selected execution mode, then control passes to interpret unit 452. On the other hand, if the emulation control unit selects compiled mode, then processing continues with compiled code segment execution unit 454.

In one embodiment, interpret unit 452 includes, for instance, a recording unit 456 that records the executed code segments. The recording unit is active if the execution count of the code segment exceeds a given threshold, as one example. If the threshold is met, then execution passes to a Just-In-Time (JIT) compiler 458. The Just-In-Time compiler is a dynamic compiler that examines the instructions, looks for opportunities to remove redundancy, and generates a matching sequence of instructions on the native platform on which the emulator is running. While the emulator has visibility to one instruction at a time, the Just-In-Time complier has visibility to a sequence instructions. Since it has visibility to a sequence of instructions, it can attempt to look for redundancies in the sequence of instructions and remove them. One example of a Just-In-Time compiler is the JAVA™ Just-In-Time compiler offered by International Business Machines Corporation, Armonk, N.Y. JAVA is a trademark of Sun Microsystems Inc., Santa Clara, Calif.

An overview of the JAVA JIT compiler is described in "Overview of the IBM Just-in-Time Compiler," T. Suganuma et al., Volume 39, Number 1, 2000, http://www.research.ibm.com/journal/sj/391/suganuma.html, which is hereby incorporated herein by reference in its entirety. Aspects of a JIT compiler are also described in, for instance, "A Framework For Reducing Instruction Scheduling Overhead In Dynamic Compilers," V. Tang, J. Siu, A. Vasilevskiy, M. Mitran, Proceedings of the 2006 Conference of the Center for Advanced Studies on Collaborative research, Article 5, 2006; "A Dynamic Optimization Framework For A Java Just-In-Time Compiler," T. Suganuma, T. Yasue, M. Kawahito, H. Komatsu and T. Nakatani, ACM SIGPLAN, Volume 36, Issue 11, November 2001; and "Memory Resource Management in VMware ESX Server," C. A. Waldspurger, In Proc. Fifth Symposium on Operating Systems Design and Implementation (OSDI '02), December 2002, each of which is hereby incorporated herein by reference in its entirety.

The Just-In-Time compiler compiles the code segment, in which the threshold was met, and stores the compiled code segment in a cache of frequently executed code segments 460. In accordance with an aspect of the present invention, this cache is distinct from another cache 462, which includes code segments selectively tagged by an operating system with unique identifiers, as further described below. Both the cache of frequently executed code segments 460 and the cache of uniquely tagged segments 462 are accessible by compiled code segment execution unit 454, which retrieves the compiled code segment to be executed from the appropriate cache and executes the code segment.

As described above, decision logic is used to determine whether a code segment is to be executed in interpret mode or compiled mode. In particular, logic is provided for determining whether a code segment to be executed is uniquely identified, and if so, to take advantage of one or more optimizations. This logic is described with reference to FIG. 5. The logic of FIG. 5 is decision point processing performed, for instance, by the CPU thread (e.g., the emulation control unit) of the emulator.

Figure 5:
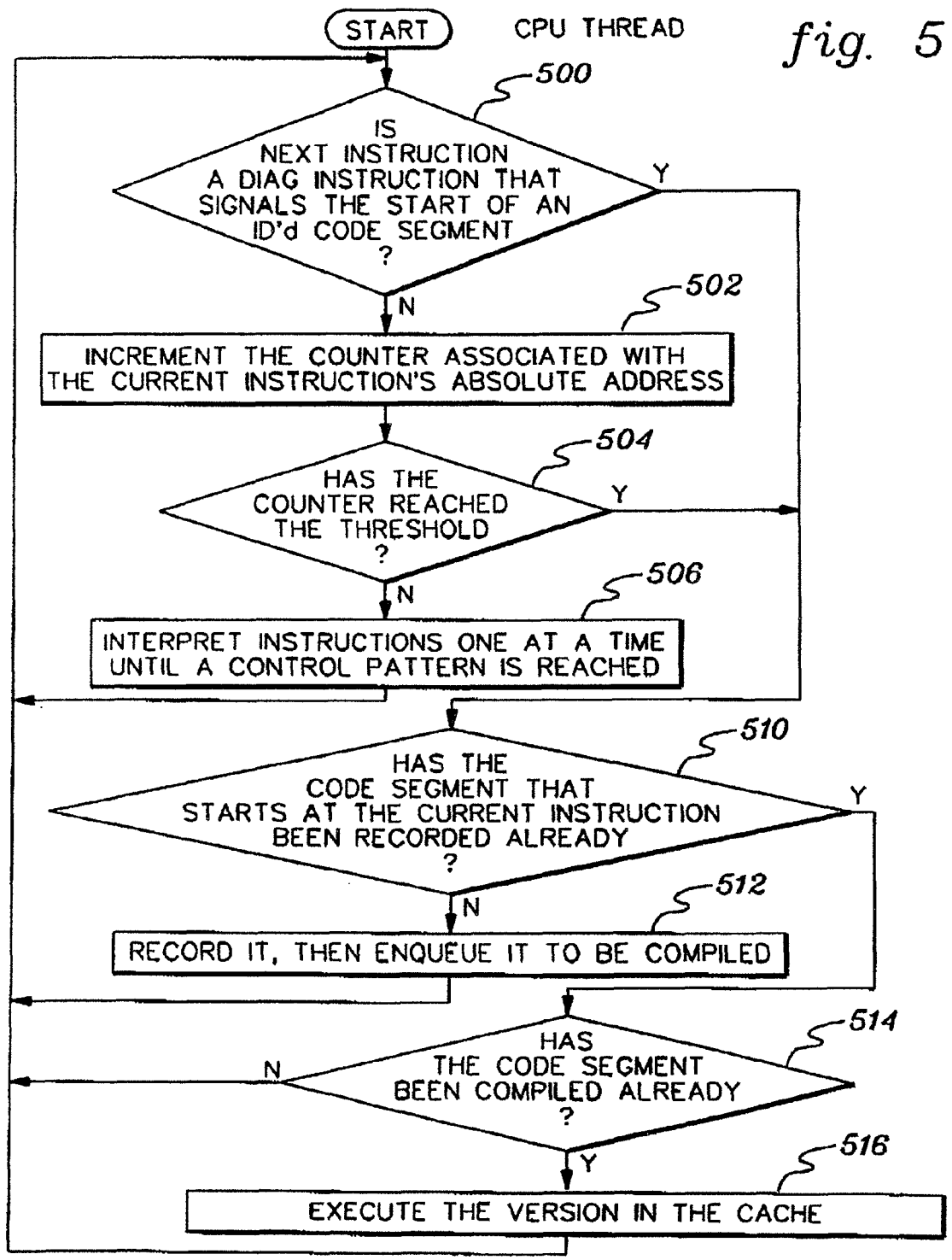
FIG. 5 depicts one embodiment of the logic associated with execution of a CPU thread in which it is determined whether an instruction is to be interpreted or executed from a cache, in accordance with an aspect of the present invention.

Referring to FIG. 5, initially, a determination is made as to whether the next instruction to be executed is a particular instruction that signals the start of a code segment marked with an identifier, INQUIRY 500. That is, in accordance with an aspect of the present invention, the guest operating system predetermines that a code segment (or trace) is to be assigned a unique identifier. This predetermination may be based on one or more factors, including, but not limited to, the importance of the code segment, frequency of execution of the code segment, etc. Should the operating system determine that the code segment is to be tagged with an identifier, it tags the code segment, via, for instance, a Diagnose instruction. With the Diagnose instruction, the operand is the identifier of the next code segment. The Diagnose instruction instructs the CPU to perform a built-in diagnostic function or other model dependent function. It can have various formats and its use depends on the model. One example of the Diagnose function is described in the above-referenced "z/Architecture Principles of Operation," IBM Publication No. SA22-7832-05, April 2007, which is hereby incorporated herein by reference in its entirety.

In one example, the identifier assigned by the operating system is an identifier (e.g., 32 bit number) that uniquely identifies the code segment and is not tied to a location (e.g., absolute, virtual, real, etc.) of the code segment. The identifier is independent of the location, so if the code segment is relocated, it can still be identified and located without requiring recompilation.

Continuing with INQUIRY 500, if the next instruction is not an instruction that signals the start of an identified code segment, then processing continues with incrementing a counter associated with the current instruction's absolute address, STEP 502. This counter tracks the frequency of execution of the instruction. Thereafter, a determination is made as to whether the counter has reached a threshold, INQUIRY 504. If the threshold has not been reached, then the instructions of the code segment are interpreted one at a time until a control pattern, such as a branch backwards, is reached, STEP 506. Thereafter, control returns to INQUIRY 500.

At INQUIRY 500, if the next instruction is an instruction that signals the start of an identified code segment, then processing is optimized by bypassing the logic used to track the frequency of execution. Instead, processing continues with INQUIRY 510, in which a determination is made as to whether the code segment that starts at the current instruction has already been recorded. If it has not been recorded, a recording buffer is allocated. As the code segment is interpreted, the recording buffer obtains information that describes the segment, as well as the current execution environment. This information includes, but is not limited to, the executed instruction's opcode, absolute address, logical address, the addressing mode and/or the values of the operands. In one example, the recording is performed by recording unit 456. After the code segment is recorded, then it is enqueued to be compiled, STEP 512, and processing continues with INQUIRY 500.

Similarly, at INQUIRY 504, if the counter has reached its threshold, then a determination is made as to whether the code segment that starts at the current instruction has already been recorded, INQUIRY 510. If not, then it is recorded and enqueued for compiling, STEP 512, and processing continues with INQUIRY 500.

Returning to INQUIRY 510, if the code segment that starts at the current instruction has already been recorded, then a further determination is made as to whether the code segment has already been compiled, INQUIRY 514. In one example, this determination is made by checking the appropriate cache to determine whether the compiled code segment is located within the cache. For instance, if INQUIRY 510 is reached from INQUIRY 500, then the cache of identified code segments 462 is checked. On the other hand, if INQUIRY 510 is reached from INQUIRY 504, then the cache of frequently executed code segments 460 is checked. In a further embodiment, both types of code segments are included in the same cache.

If the code segment is not in the appropriate cache, then it has not been compiled, and processing continues with INQUIRY 500. Otherwise, the version of the code segment in the cache is executed, STEP 516. Again, processing then continues with INQUIRY 500.

As described above, certain code segments are enqueued to be compiled. One embodiment of the logic associated with compiling those code segments is described with reference to FIG. 6. In this example, the compiler thread (e.g., the JIT compiler) performs this logic.

Figure 6:
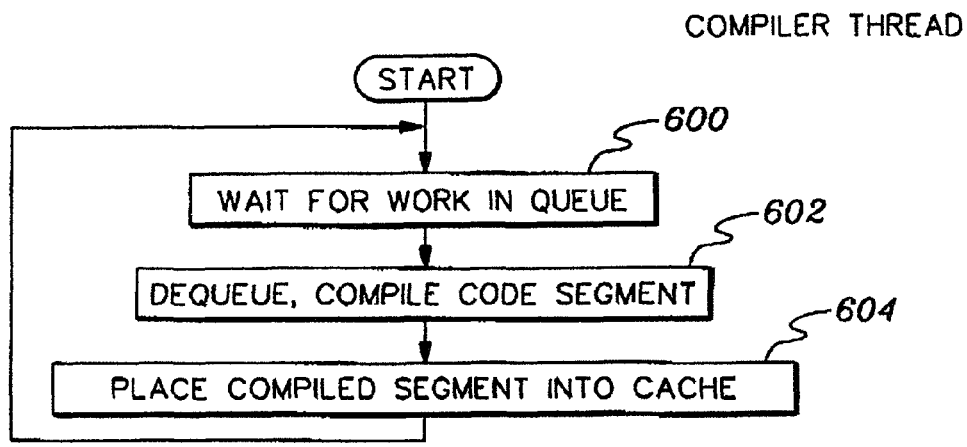
FIG. 6 depicts one embodiment of the logic associated with placing a code segment into a cache, in accordance with an aspect of the present invention.

Referring to FIG. 6, initially, the compiler waits for work in the queue, STEP 600. When work is in the queue, the queue is dequeued and the code segment is compiled, STEP 602. The compiled code segment is then placed into the appropriate cache of compiled code segments, STEP 604. In another example, there is a queue for identified code segments and another queue for frequently executed code segments.

As described above, by tagging code segments (or other static memory objects) with unique identifiers, certain optimizations are performed, in accordance with an aspect of the present invention. For instance, when a processing platform, such as the emulator, recognizes a code segment tagged by the operating system (e.g., guest operating system), the emulator saves aspects of its internal state, along with the identifier, in a saved area. In one example, this is the saving of a compiled code segment and its identifier in the cache of identified code segments enabling faster access to the code segment.

As a further optimization, the processing platform retrieves the saved internal state, provided that the identifier in the retrieve request matches the identifier of the code segment. This includes, for instance, retrieving, by the emulator, the compiled version of the code segment from the appropriate cache.

In addition to the above, a further optimization is provided that is related to memory management, and in particular, to store monitoring. One embodiment of this logic is described with reference to FIG. 7, which is executed by, for instance, memory access unit 422 of the emulator.

Figure 7:
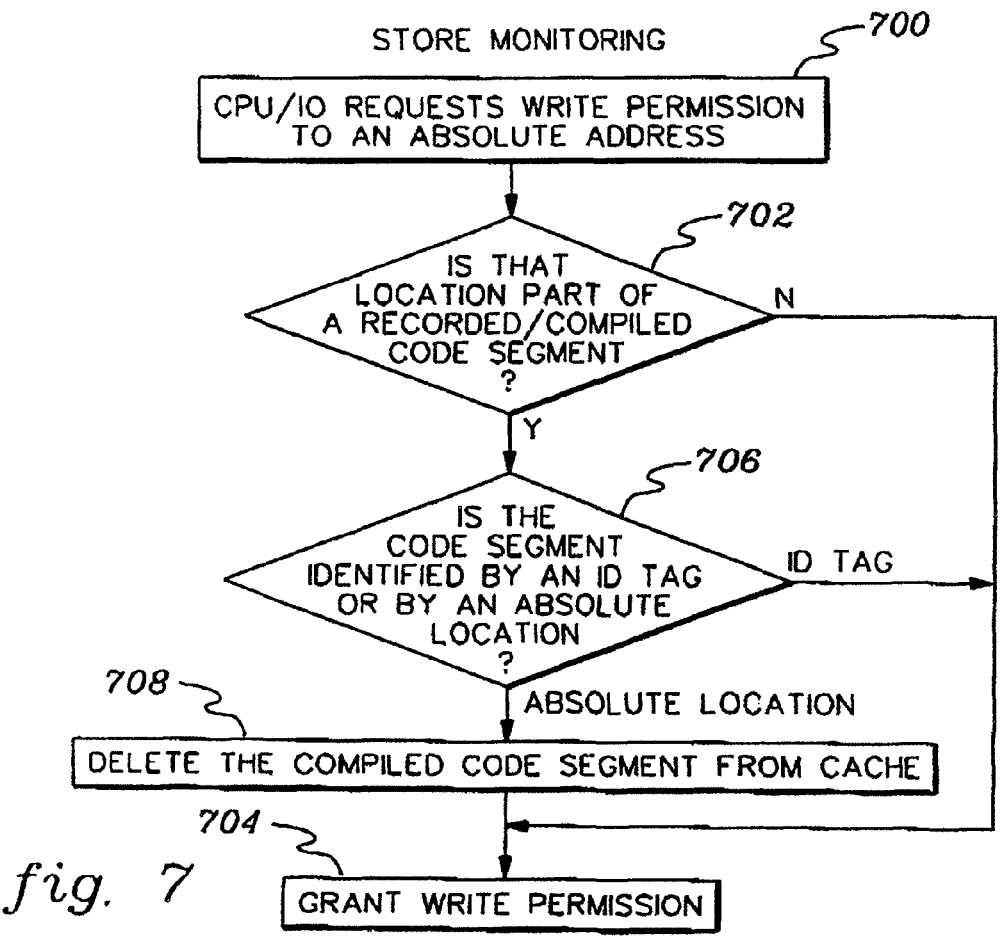
FIG. 7 depicts one embodiment of the logic associated with determining whether a compiled code segment is to be deleted from a cache, in accordance with an aspect of the present invention.

Referring to FIG. 7, initially, a CPU or the I/O requests write permission to an absolute address, STEP 700. In response to this request, a determination is made as to whether that location is part of a recorded/compiled code segment, INQUIRY 702. If it is not part of a recorded/compiled code segment, then write permission is granted, STEP 704.

However, returning to INQUIRY 702, if that absolute address is part of a recorded/compiled code segment, then a further determination is made as to whether the code segment is identified by an id tag or by an absolute location, INQUIRY 706. If the code segment is identified by absolute location, then the compiled code segment is deleted from the appropriate cache, STEP 708, and write permission is granted, STEP 704. However, if the code segment is identified by an id tag, then write permission is granted, STEP 704, and the code segment is not deleted from the cache. That is, in accordance with an aspect of the present invention, when a code segment is tagged by the unique identifier provided by the operating system, that code segment need not be deleted from the cache. This improves performance.

Although in the above examples code segments are referred to, one or more aspects of the present invention are applicable to other static memory objects, such as data areas, etc. As used herein, a static memory object is one in which the data is unchanged (read-only), however, its location in memory may change.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
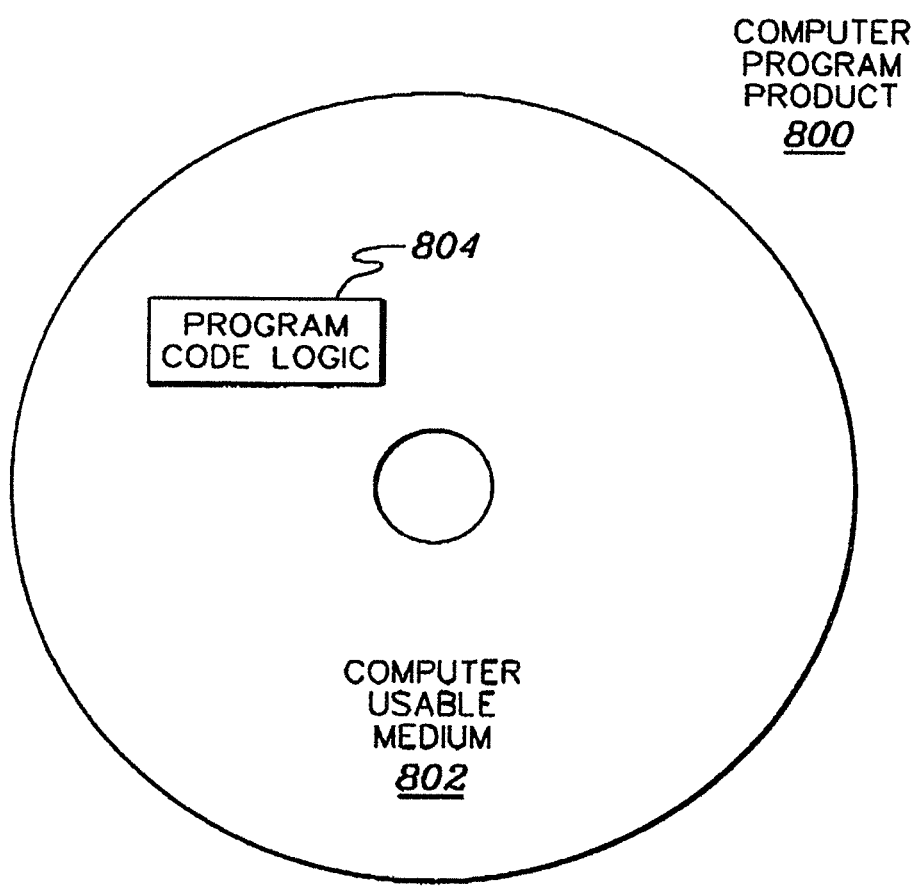
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Described in detail above are various optimizations provided for processing environments, including emulated environments. As one example, one or more aspects of the present invention relate to the non-architected interaction of the applications/operating system running on an emulated system with the underlying emulator. The emulator is directed to bypass certain tasks/reuse certain compiled code segments, instead of relying solely on the architectured features of the system.

For instance, the operating system (e.g., z/OS) tags selected code segments with unique identifiers, instead of by absolute address, and when the emulator recognizes such a tagged code segment, it bypasses a collection of statistics. In particular, in one example, the emulator maintains counters for branch targets to collect statistics and to detect code segments that are executed frequently. After such code segments are detected, a serious investment is made: the frequently executed code segment is copied into a buffer and a Just-In-Time compiler is invoked to compile the code segment (e.g., z-code) to native code (e.g., Intel). The compiled code is stored in a code cache. The interpreter, upon hitting the same entry point again, transfers the control to the compiled code. In accordance with an aspect of the present invention, this task of tracking the frequency of executed instructions is bypassed when an identified code segment is encountered.

Moreover, the emulator, in response to recognizing a tagged code segment, compiles the segment, if not previously compiled, and places the compiled code segment in a cache for subsequent retrieval. By maintaining the code segment in the cache, speed of access is enhanced, as well as system performance.

Additionally, the operating system running on the emulator performs memory management. During that process, it may swap a page out of memory and may reload that page later into a different absolute (but identical logical) address. In accordance with an aspect of the present invention, the operating system tags code segments with unique IDs. The emulator recognizes these IDs (in the emulated code stream) and applies special handling rules to the tagged code segments. For instance, it does not delete these code segments when their source is modified (this happens when the page is swapped out by the zOS, and the absolute address is replaced by a new page), but keeps them in the cache. When the tag is encountered again, possibly at a different absolute address (the OS reloaded the page and executes code on it), no re-compilation is necessary. The cached compiled code is used immediately.

Advantageously, by providing various optimizations, system performance is enhanced. Cooperation between the operating system (e.g., guest operating system) and the processing platform (e.g., emulator) is provided. The emulator, based on information (e.g., tags by the operating system), bypasses certain tests/reuses certain compiled code segments to improve performance.

Although various embodiments are described above, these are only examples. For instance, the processing environment can include processing units that are based on architectures other than Power4, PowerPC® or Intel®. Additionally, servers other than pSeries® servers can incorporate and use one or more aspects of the present invention. Further, the processing environment can emulate environments other than z/Architecture®. Additionally, various emulators can be used. Emulators are commercially available and offered by various companies. Yet further, the processing environment need not include emulator code. Many other types of processing environments can incorporate and/or use one or more aspects of the present invention.

Moreover, although code segments are described herein, other memory objects can be similarly managed to optimize system performance. One or more aspects of the present invention can be used to optimize branch predictions, use of translation look-aside buffers, as well as other aspects of processing.

Further, although an example of a control pattern is mentioned herein, other control patterns may be used. Additionally, the operating system can take into account additional, less or different factors than those described herein in order to determine when to tag a particular memory object with a unique identifier. Additionally, the tagging can be performed by any mechanism desired by the operating system. Yet further, although the operating system is performing the tagging in the described embodiments, in one or more other embodiments, an entity other than the operating system may perform the tagging. Again, although various examples are described herein, these are only examples. Other changes, additions or deletions may be made without departing from the spirit of the present invention.

Yet further, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating optimization of a processing environment, said computer program product comprising:
a non-transitory computer readable storage medium readable by a processing circuit and storing instructions for execution by the processing circuit for performing a method comprising:
determining by a processing platform of the processing environment that a static memory object has been marked with an identifier as a prior indication that a compiled version of the static memory object is to be cached, wherein said static memory object has been marked by an operating system of the processing environment based on the operation system predetermining that the static memory object is to be assigned the identifer indicating that a compiled version of the static memory object is to be cached, and wherein said static memory object has been marked with the identifier prior to compilation or translation of the static memory object, the static memory object comprising a code segment to be executed, and wherein said identifier is not tied to a location of the static memory object; and
based on the determining, saving one or more aspects of an internal state of the processing platform and said identifier in a saved area to optimize access of the static memory object, wherein the saved area comprises a code cache of identified compiled code segments, said code cache being separate from a cache of compiled versions of frequently executed code segments, and said identified compiled code segments comprising a compiled version of the identified static memory object.

2. The computer program product of claim 1, wherein the method further comprises retrieving, based on a request, at least one aspect of the one or more saved aspects of the internal state provided that the identifier matches an identifier specified in the request.

3. The computer program product of claim 1, wherein the processing platform is an emulator of an emulated processing environment, and the operating system is a guest operating system of the emulated processing environment.

4. The computer program product of claim 1, wherein the method further comprises bypassing, based on the determining, logic that determines if the code segment is frequently executed.

5. The computer program product of claim 1, wherein the method further comprises performing a look-up in the code cache for an identifier of the code segment, wherein based on a failure of the look-up, the code segment is compiled and the compiled code segment is stored in the code cache, and based on the look-up succeeding, the compiled code segment is executed.

6. The computer program product of claim 1, wherein said method further comprises bypassing a code segment invalidation mechanism that governs the code cache.

7. The computer program product of claim 6, wherein the bypassing the code segment invalidation mechanism comprises not deleting the code segment from the code cache based on modification of source of the code segment.

8. The computer program product of claim 1, wherein the identifier comprises a unique identifier.

9. The computer program product of claim 1, wherein the indentifier comprises an operated of a diagnostic instructing markingthe static memory object.

10. A method of facilitating optimization of a processing environment, said method comprising:
determining by a processing platform of the processing environment that a static memory object has been marked with an identifier as a prior indication that a compiled version of the static memory object is to be cached, wherein the static memory object has been marked by an operating system of the processing environment based on the idenfier indicating that a compiled version of thr static memory object is to be cached, and wherein the static memory object has been marked with the identifier prior to compilation or translation of the static memory object, the static memory object comprising a code segment to be executed, and wherein said identifier is not tied to a location of the static memory object; and
based on the determining, saving one or more aspects of an internal state of the processing platform and said identifier in a saved area to optimize access of the static memory object, wherein the saved area comprises a code cache of identified compiled code segments, said code cache being separate from a cache of compiled versions of frequently executed code segments, and said identified compiled code segments comprising a compiled version of the identified static memory object.

11. The method of claim 10, wherein the processing platform is an emulator of an emulated processing environment, the operating system is a guest operating system of the emulated processing environment, and wherein the method further comprises bypassing, based on the determining, logic that determines if the code segment is frequently executed.

12. The method of claim 10, wherein the processing platform is an emulator of an emulated processing environment, the operating system is a guest operating system of the emulated processing environment, and wherein the method further comprises performing a look-up in the code cache for an identifier of the code segment, wherein based on a failure of the look-up, the code segment is compiled and the compiled code segment is stored in the code cache, and based on the look-up succeeding, the compiled code segment is executed.

13. The method of claim 10, wherein the processing platform is an emulator of an emulated processing environment, the operating system is a guest operating system of the emulated processing environment, and said method further comprises bypassing a code segment invalidation mechanism that governs the code cache.

14. The method of claim 13, wherein the bypassing the code segment invalidation mechanism comprises not deleting the code segment from the code cache based on modification of source of the code segment.

15. A computer system of facilitating optimization of a processing environment, said computer system comprising:
a memory; and
a processor in communications with the memory, wherein the computer system is configured to perform a method, said method comprising:
determining by a processing platform of the processing environment that a static memory object has been marked with an identifier as a prior indication that a compiled version of the static memory object is to be cached, wherein said static memory object has been marked by an operating system of the processing environment based on the operating system predetermining that the static memory objected is to be assinged the identifer indicating that a compiled version of the static memory object is to be and wherein the static memory object has been marked with the identifier prior to compilation or translation of the static memory object, the static memory object comprising a code segment to be executed, and wherein said identifier is not tied to a location of the static memory object; and
based on the determining, saving one or more aspects of an internal state of the processing platform and said identifier in a saved area to optimize access of the static memory object, wherein the saved area comprises a code cache of identified compiled code segments, said code cache being separate from a cache of compiled versions of frequently executed code segments, and said identified compiled code segments comprising a compiled version of the identified static memory object.

16. The computer system of claim 15, wherein the processing platform is an emulator of an emulated processing environment, the operating system is a guest operating system of the emulated processing environment.

17. The computer system of claim 15, wherein the method further comprises bypassing, based on the determining, logic that determines if the code segment is frequently executed.

18. The computer system of claim 15, wherein the method further comprises performing a look-up in the code cache for an identifier of the code segment, wherein based on a failure of the look-up, the code segment is compiled and the compiled code segment is stored in the code cache, and based on the look-up succeeding, the compiled code segment is executed.

19. The computer system of claim 15, wherein said method further comprises bypassing a code segment invalidation mechanism that governs the code cache.

* * * * *